324-77 CROSS REFERENCE SEARCH ROOM

July 22, 1969 P. S. CROSBY 3,457,505
OSCILLOGRAPHIC INSTRUMENT FOR SEPARATELY
VIEWING PORTIONS OF AN INPUT SIGNAL
Filed Feb. 18, 1966 2 Sheets-Sheet 1

PHILIP S. CROSBY
INVENTOR
BY
BUCKHORN, BLORE, KLARQUIST & SPARKMAN
ATTORNEYS

PHILIP S. CROSBY
INVENTOR
BY
BUCKHORN, BLORE, KLARQUIST & SPARKMAN
ATTORNEYS

United States Patent Office 3,457,505

Patented July 22, 1969

3,457,505

OSCILLOGRAPHIC INSTRUMENT FOR SEPARATELY VIEWING PORTIONS OF AN INPUT SIGNAL

Philip S. Crosby, Beaverton, Oreg., assignor to Tektronix, Inc., Beaverton, Oreg., a corporation of Oregon Filed Feb. 18, 1966, Ser. No. 528,607
Int. Cl. G01r *13/24*
U.S. Cl. 324—121 10 Claims

ABSTRACT OF THE DISCLOSURE

An oscilloscope includes means for periodically adding electrical values to the horizontal and vertical deflection signals thereby producing first and second displays of an input waveform. At times corresponding to the production of the second display, the horizontal deflection of the oscilloscope is delayed by an adjustable amount so that the second display depicts a portion of the input signal at a time different from the first display in order that signal portions can be compared with one another.

This invention relates to a delayed sweep oscillographic instrument and particularly to such an instrument for examining and comparing separate portions of a repetitive input signal.

An oscillographic device such as a cathode ray oscilloscope conventionally displays the waveform of a repetitive input signal. Such an instrument includes vertical deflection means for producing the magnitude dimension of the display in accordance with the magnitude of the input signal, as well as horizontal deflection means providing a repetitive time base. Upon each recurrence of an input signal waveform, the time base causes the cathode ray tube's electron beams to trace across the cathode ray tube screen, as the vertical deflection means causes the beam to deflect in a vertical direction giving the display its characteristic waveform shape. The operation of the horizontal deflection means is generally repetitive and in synchronism with repetitions of the input signal resulting in a substantially stationary display for representing the input signal.

It is often desirable to observe and compare in some detail separate parts of an input signal. For example, it may be desired to display and compare separate vertical synchronization signals or the like as employed in television transmission. Separate vertical intervals may contain different information as, for example, in the case of vertical interval test signals employed in color television broadcasting. Although vertical interval signals vary as test information is provided, whereby it becomes desirable to compare portions of one with portions of another, such vertical signals conveniently cause common triggering of horizontal deflection means in an oscilloscope.

Therefore, it is an object of the present invention to provide improved oscillographic apparatus for comparatively displaying different events from substantially the same recurrent electrical input signal.

It is another object of the present invention to provide an improved oscillographic instrument portraying in a sequence and in some detail, different events that are substantially separated in time.

In accordance with an embodiment of the present invention, an oscillographic instrument, for example, a cathode ray oscilloscope, includes vertical and horizonal deflection means contributing to the presentation of a first display of a repetitive input signal. Means are also employed in conjunction with the aforementioned deflection means for providing a second display of said input signal adjacent the first which second signal may differ in some respects from the first. According to the present embodiment, the displacement of the second display with respect to the first is attained through periodic addition of predetermined electrical values to the horizontal and/or vertical deflection signals at times corresponding to selected repetitions of the input signal. Also, at such selected times, the horizontal deflection is delayed by a selected and adjustable amount such that the second display depicts portions of the input signal at a time somewhat different from the first display for comparison of such signal portions with one another. In this manner, it is possible to display in apparent sequence two events that may be rather widely separated in time and for which separate trigger signals are unavailable or not easily obtainable, by virtue of the fact that such different events occur in substantially the same recurrent electrical input signal.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with accompanying drawings wherein like reference characters refer to like elements and in which:

Figure 1:
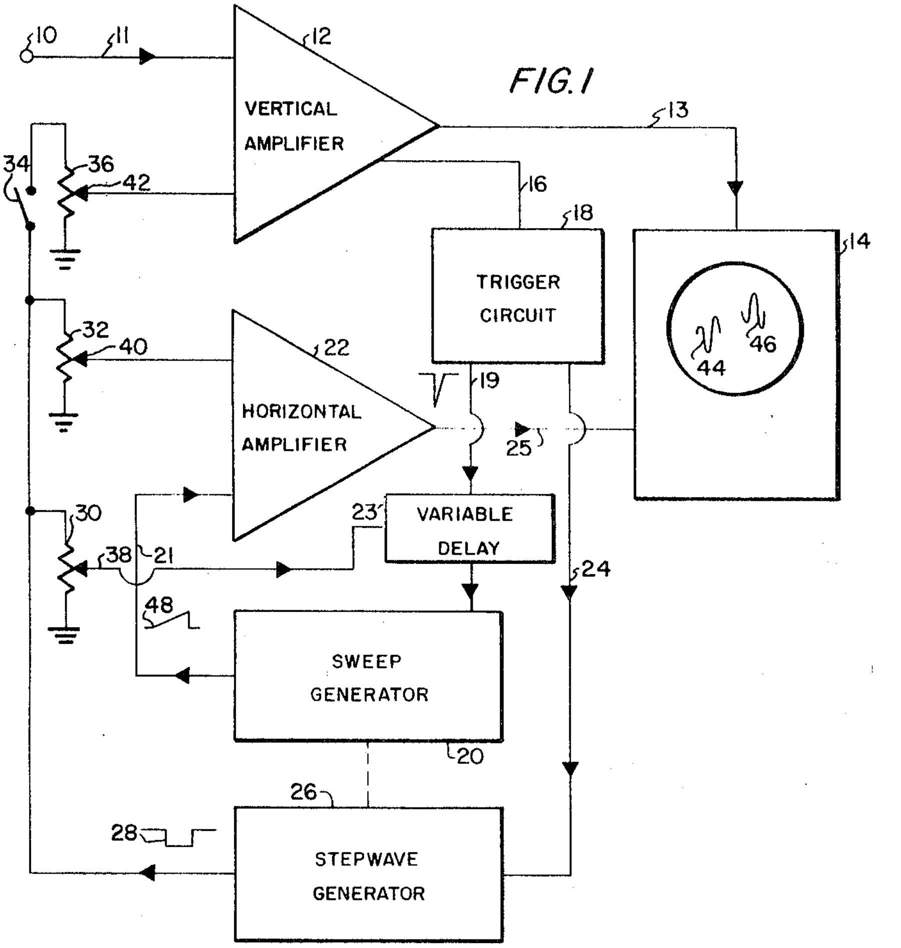
FIG. 1 is a block diagram of first embodiment according to the present invention.

Referring to FIG. 1, an input signal which is to be displayed on an oscillographic instrument, is applied via input terminal 10 to a vertical amplifier 12 by way of input lead 11. The vertical amplifier 12 forms a part of the vertical deflection means in the oscillographic instrument, and provides a vertical deflection waveform output at 13 for application to a display means 14, for example, for application to the vertical deflection plates in a cathode ray tube.

A second output of vertical amplifier 12, indicated at 16, is coupled to the input of a trigger circuit 18, the latter being sensitive to a particular amplitude and slope of input waveform. At a time corresponding to a preselected point on the input waveform, trigger circuit 18 develops a sharp trigger signal for application to sweep generator 20. The trigger signal output at 19 from trigger circuit 18 is applied to sweep generator 20 by way of variable delay means 23 hereinafter discussed. In sweep generator 20 a horizontal deflection signal 48 in the form of a ramp voltage is generated for establishing the time base sweep for the instrument. The horizontal deflection signal 48 from sweep generator 20 is coupled to horizontal amplifier 22, the output of which is in turn applied to display means 14 causing horizontal, left to right deflection establishing a time base for the display. For example, when display means 14 comprises a cathode ray tube, the output of horizontal amplifier 22 is suitably applied to the horizontal deflection plates thereof.

In accordance with the present invention an output 24 of the trigger circuit 18, being substantially the same trigger impulse as indicated at 19, is applied to a step wave generator 26 providing a step wave or square wave output 28 at times corresponding to the occurrence of selected trigger signals at 24. Step wave generator 26 is suitably a bistable or multi-stable circuit changing its state and its output from one voltage level to another upon the receipt of an input trigger signal. Thus step wave generator 26 suitably produces a negative going square wave output 28, the beginning of which corresponds to every other trigger input, and therefore corresponding to every other occurrence of the input signal applied at terminal 10.

Input to step wave generator 26 is alternatively provided from sweep generator 20. Thus, instead of the pulse output 28 being initiated upon receipt of a trigger signal, the output may be produced upon the conclusion of selected ramp waveforms in sweep generator 20. Thus, step wave generator 26 may change its state from an output producing to a non-output producing condition or vice-versa on receipt of the end of each previous ramp signal 48 or at the end of each horizontal sweep.

Output 28 of step wave generator 26 is applied to a first potentiometer 30 and a second potentiometer 32, and through a switch 34 to a third potentiometer 36. These potentiometers are respectively provided with movable taps 38, 40 and 42 employed for adjusting the magnitude of output 28 as it appears between ground and the potentiometer tap. Potentiometer tap 38 applies output 28 as a control voltage to variable delay means 23 for controlling the delay of such delay means. Tap 40 is coupled as an additional input to horizontal amplifier 22 such that output 28 is added to the ramp voltage signal 48 as it appears at 21, which addition causes a horizontal displacement in the display of the input signal at the time output 28 occurs. For example, during the presence of output 28, the display on display means 14 is moved from a location indicated at 44 in a horizontal direction to a second location indicated at 46, with the amount of such displacement being dependent upon the positioning of movable tap 40.

Similarly output 28, as adjusted with tap 42 of potentiometer 36 when switch 34 is closed, is applied as an additional input to vertical amplifier 12, adding to the signal input at 11. Such addition causes a vertical displacement in the display means, e.g., the vertical displacement between location 44 and location 46 on the display means, with the amount of displacement being governed by positioning of tap 42 on potentiometer 36. Since output 28 is added as an input to the horizontal and vertical amplifiers only at the time of alternate occurrences of the trigger signal at 24, it will be appreciated that both the display at location 44 and the display at location 46 will be simultaneously observed on display means 14. This simultaneous display is due to persistence of vision and the image retention characteristics of the cathode ray tube phosphors. Since output 28 as here illustrated is negative going, and since rightward and upward deflection displacement on the image means conventionally implies a positive change in deflection voltage, it is appreciated that such output 28 is suitably added to amplifiers 12 and 22 in a differential sense.

The displacement of one display of the input signal with respect to another display thereof by means of calibrated voltages, e.g., for determination of dimensional parameters of the input waveform, is subject matter disclosed and claimed in copending application Ser. No. 528,625 of Gordon D. Long, which is assigned to the assignee of the present invention.

Variable delay means 23 performs the function of delaying the trigger signal as applied to sweep generator 20 and therefore delays the start of the sweep or ramp signal 48, so that different portions of the input signal are viewed at locations 44 and 46. The delay is under the control of output 28 from step wave generator 26 and occurs only when the negative going output 28 is present, e.g. during every other occurrence of the input signal. Thus the display at location 46 in display means 14 represents a portion of the input signal at a time delayed with respect to the input signal viewed at location 44. This kind of display allows examination of two time separated portions of the input signal. It is appreciated that the triggering point as determined with trigger circuit 18 may be suitably adjusted such that the interval between triggers includes both the portion of the input signal viewed at location 44 and the portion of the input signal viewed at location 46. Moreover, the length of ramp signal 48 is adjusted such that the portion of the input signal displayed at location 44 and the portion of the input signal displayed at location 46 have the desired time duration.

The amount of time delay between the occurrence of the portions of input waveform displayed at locations 44 and 46 is adjusted by moving tap 38 on potentiometer 30 which adjusts the magnitude of output 28 applied to vary the delay of variable delay means 23. As thus appears, the time separation between displays is adjustable by means of potentiometer 30 while the physical separation on the display means is adjusted by means of potentiometers 32 and 36. Therefore, portions of input waveform separated in time can be adjusted in spatial relation with respect to one another for comparison purposes.

Although for purposes of explanation step wave generator 26 has thus far been described as a two state device, step wave generator 26 may also comprise a stair step generator producing a plurality of successive voltage levels on the receipt of successive or selected trigger inputs. Under these circumstances, a plurality of subsequent displays may be caused to occur in vertical and/or horizontal array, with each successive display portraying a more delayed portion of the input signal. It is also appreciated that one or both of the taps 40 and 42 of potentiometers 32 and 36 may be placed at the zero voltage level or ground point if so desired to prevent horizontal and/or vertical displacement of portions of the input signal. However, displacement in at least one dimension is desirable.

The variable delay means 23 may be implemented in a number of different ways. For example, the output 28 from tap 38 and the trigger signal at 19 may be added in variable delay means 23 with sweep generator 20 being responsive to initiate a sweep either at the occurrence of a positive going trigger signal at 19, or the positive going conclusion of output 28. Since the two signals are added, the positive going trigger signal may be rendered ineffective to trigger sweep generator 20 if, and as long as, negative going output 28 is also present. Thus, one but not both will initiate the sweep.

Figure 2:
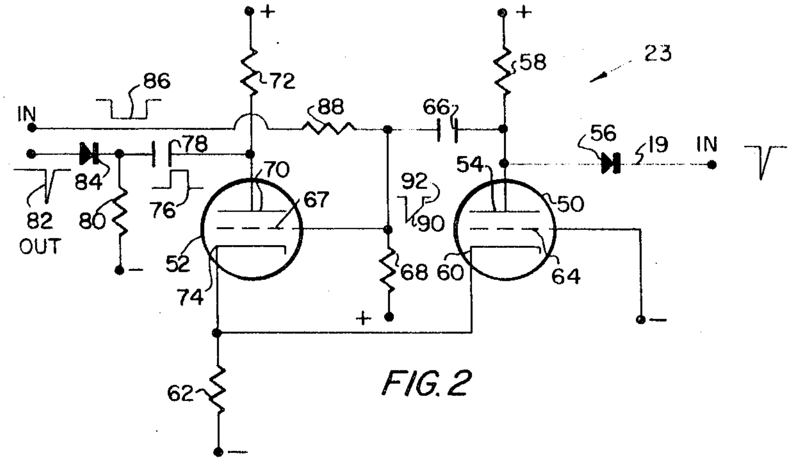
FIG. 2 is a schematic diagram of a variable delaying circuit employed with the FIG. 1 device.

A preferred circuit for implementing variable delay means 23 is illustrated in FIG. 2. The circuit comprises a cathode coupled monostable multivibrator including a first tube 50 and a second tube 52. The anode 54 of tube 50 receives a negative going trigger pulse at 19 through negatively poled diode 56. The anode 54 of tube 50 is supplied current through load resistor 58 coupled to a positive voltage source, while cathode 60 is returned to a negative voltage source through cathode resistor 62. The grid 64 is connected to a negative bias source. A time constant circuit comprising capacitor 66 and resistor 68 is disposed between the tubes 50 and 52 and determines the time constant and hence the duration of output pulse produced by the circuit. Capacitor 66 is connected between anode 54 of tube 50 and grid 67 of tube 52, while resistor 68, also connected to grid 67, is coupled to a positive voltage source. The anode 70 of tube 52 is provided current through load resistor 72, and cathode 74 of tube 52 is also coupled through the common cathode resistor 62 to a negative voltage source. An output pulse 76 is produced at anode 70 which pulse is differentiated by means of capacitor 78 and resistor 80 to produce an impulse 82 at the conclusion of the output pulse 76. Impulse 82 is provided through negative poled diode 84 and hence only a negative going impulse results. A control signal 86 is applied to grid 67 through resistor 88. This control signal has the effect of altering the length of the output pulse 76 produced by the circuit and hence changes the time of production of impulse 82.

In operation of the FIG. 2 circuit, the negative going trigger impulse applied at 19 is effective to produce impulse 82 for application to sweep generator 20 in FIG. 1 at a time determined by control signal 86. Control signal 86 corresponds to output 28 in the FIG. 1 circuit and hence occurs only for selected occurrences of the trigger pulse at 19, and hence only for selected repetitions, e.g. every other repetition, of the input signal. Tube 52 is normally conducting, drawing a reasonably large current through cathode resistor 62, therefore providing a relatively positive voltage at cathode 74. Since cathode 74 is connected to cathode 60 and since grid 64 is connected to a negative bias source, tube 50 is normally cut off. However, a trigger signal at 19 coupled through capacitor 66 to grid 67 is effective to reduce the current in tube 52. The voltage at cathode 74 drops and tube 50 starts to conduct causing a drop in the potential of anode 54. The action is cumulative, and tube 50 will now conduct while tube 52 is shut off. The time during which the latter condition persists normally depends primarily on the time constant circuit, e.g. the capacitor 66-resistor 68 combination. The waveform at grid 67 during this period is illustrated at 90. When the grid rises to cutoff point 92, the tube 52 again starts to conduct and tube 50 is cut off. However, during the time that tube 52 conducts, output pulse 76 is produced at its anode 70. Both the forward and trailing edges of output pulse 76 are differentiated by means of capacitor 78 and resistor 80, but only the negative going impulse 82, corresponding to the conclusion of pulse 76, is passed through diode 84.

When control signal 86, corresponding to output 28 of step wave generator 26 in FIG. 1 is applied to grid 67 through resistor 88, it adds to waveform 90 in a negative direction delaying the time at which cut off point 92 is reached. Therefore, application of such control signal 86 is effective to change the delay of the circuit and the time at which impulse 82 is produced. The amount of delay is controlled by the magnitude of control signal 86 and, therefore, the magnitude of delay is conveniently controlled by means of selectable placement of tap 38 of potentiometer 30.

Figure 3:
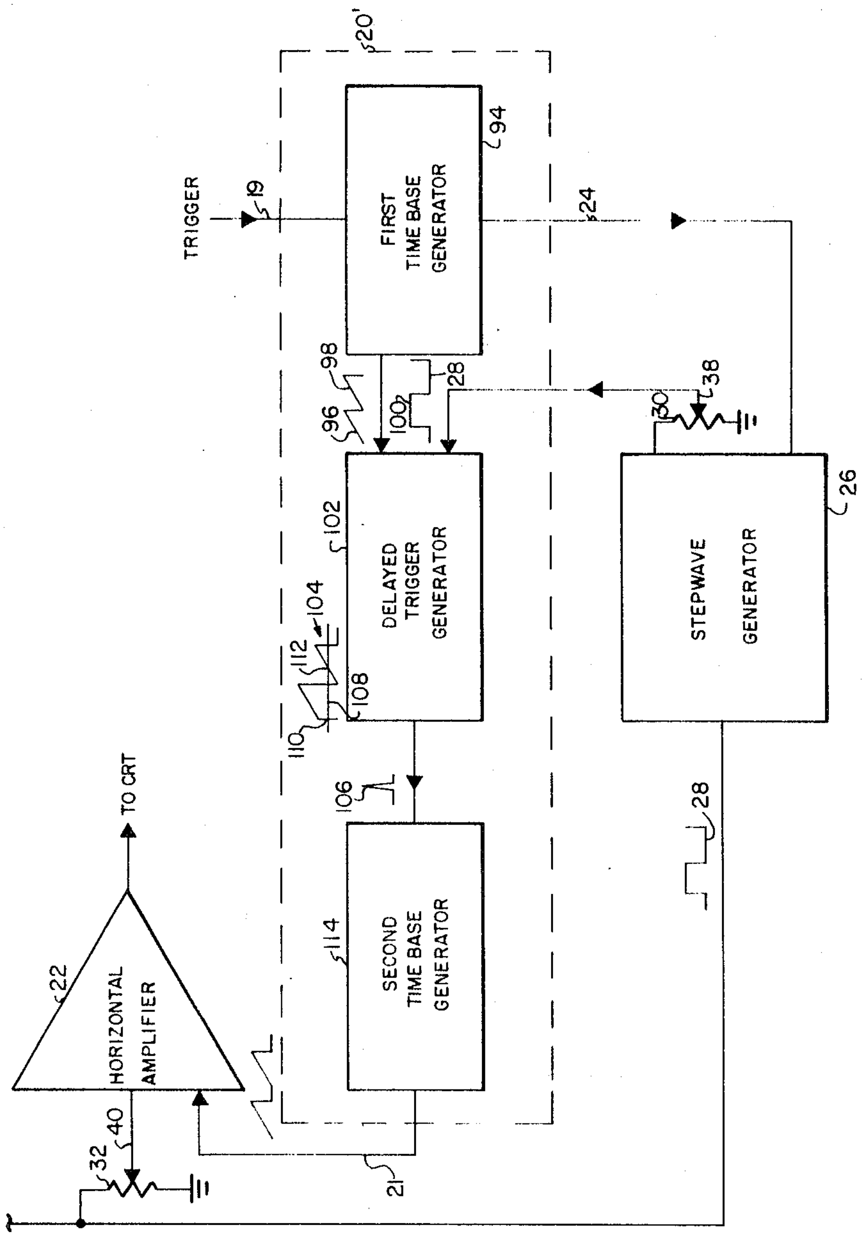
FIG. 3 is a block diagram of a second embodiment according to the present invention.

FIG. 3 illustrates a second embodiment according to the present invention. This embodiment operates generally in a substantially similar manner to the embodiment herein before described but partially incorporates variable delay means within sweep generator 20'. FIG. 3 illustrates a part of the complete circuit, the circuit being otherwise substantially the same as the circuit of FIG. 1 with respect to those elements not here indicated as different. The input to step wave generator 26 comprises either the trigger signal at 19 or an impulse related thereto, for example, one indicating the conclusion of a ramp signal in sweep generator 20'. Step wave generator 26 again produces a negative going pulse output 28 appplied to potentiometer 32 in horizontal amplifier 22, and the same output may also be applied to the vertical amplifier. The same output is also applied by means of variable tap 38 of potentiometer 30 to the sweep generator 20'.

In sweep generator 20', a first time base generator 94 produces ramp waveforms 96 and 98 in response to successive trigger inputs at 19. The first ramp occurs at a time 100 when step wave generator 26 is in an "off" condition, and ramp waveform 98 corresponds in time to negative output 28 of step wave generator 26. These two inputs are added in delayed trigger generator 102 as illustrated by waveform 104. Delayed trigger generator 102 produces an output impulse 106 as a positive going portion of waveform 104 crosses a threshold level 108. It is seen this threshold level is crossed at 110 and also at 112. The first of these crossings corresponds to the time the trigger signal is received at 19. However, the second crossing 112, corresponds to a time which is delayed with respect to a second occurrence of such trigger signal at 19. The delay is governed according to the setting of delayed trigger generator 102 and may be adjusted by altering the position of threshold level 108 in a manner known to those skilled in the art. Thus, the production of impulse 106 is delayed with respect to the trigger input at 19, e.g. for every other occurrence of the trigger signal, or for every other repetition of the input signal. Therefore, a ramp signal produced at 21 by second time base generator 114 and applied to horizontal amplifier 22 is delayed for every other repetition of the input signal and the second display of such input signal will represent a portion thereof delayed with respect to the first display of such input signal, whereby the two portions of such signal are readily compared with one another.

I claim:

1. In an oscillographic instrument providing a first display of a recurrent electrical input signal, said instrument including vertical deflection means generating a vertical deflection signal in accordance with the instantaneous amplitude of said input for determining the amplitude of said first display, and wherein said instrument includes horizontal deflection means generating a horizontal deflection signal for providing a time base sweep, the improvement comprising means for periodically causing displacement in the deflection of said deflection means to provide a second adjacent display of said input, and means for delaying the generation of said horizontal deflection signal at times substantially concurrent with said displacement of said deflection such that said second display is representative of a subsequent portion of said input so as to provide comparison between time separated portions of the same input signal.

2. The method of providing comparison of time separated portions of an input signal in an oscillographic instrument including vertical deflection means generating a vertical deflection signal in accordance with the instantaneous amplitude of said input signal and including horizontal deflection means generating a horizontal deflection signal for providing a time base sweep, said method comprising displacing selected recurrences of said input signal as displayed by said oscillographic instrument to provide a second display of said input signal adjacent the first display thereof, and at the same time delaying the generation of said horizontal deflection signal by a substantially uniform amount such that the second display of said input signal is also separated in time with respect to the first display.

3. An oscillographic instrument providing a first display of a recurrent electrical input signal, said instrument comprising vertical deflection means generating a vertical deflection signal in accordance with the amplitude of said input signal for determining the amplitude of such first display, horizontal deflection means generating a horizontal deflection signal for providing a time base sweep, means for periodically adding an electrical value to at least one such deflection signal in said oscillographic instrument causing displacement in the deflection of said deflection means to provide a second display of said input, and means for delaying the generation of said horizontal deflection signal at times corresponding to the generation of said second display so that said second display depicts said input signal at a time subsequent to said first display in order to provide a comparison between time separated portions of the same input signal.

4. The oscillographic instrument according to claim 3 further including means for selectively adjusting the delay of said means for delaying the generation of said horizontal deflection signal to vary the time separation between said first display and said second display.

5. The oscillographic instrument according to claim 3 also including means to vary said electrical value to vary the displacement in the deflection of said deflection means for variable positioning of said second display.

6. The oscillographic instrument according to claim 3 wherein said horizontal deflection includes trigger circuit means for providing trigger signals corresponding to preselected portions of said recurrent input signal, and sweep generator means operative in response to said trigger signals for initiating said time base sweep, and wherein said means for delaying the generation of said horizontal deflection signal comprises a step wave generator providing a step wave output in response to selected of said trigger signals, and a variable delay means interposed between said trigger circuit means and at least a portion of said sweep generator means for causing a delay in the initiation of said time base sweep by said sweep generator means upon receipt of an output from said step wave generator.

7. The oscillographic instrument according to claim 6 wherein said variable delay means comprises a monostable multivibrator receiving said trigger signal as a triggering input thereof and producing an output pulse the length of which is dependent upon the output of said step wave generator and the conclusion of which initiates said time base sweep of said sweep generator, the output of said step wave generator acting to alter the operating time constant of said monostable multivibrator.

8. The oscillographic instrument according to claim 3 wherein said horizontal deflection means includes a trigger circuit producing a first trigger signal at a time corresponding to a portion of said input signal and a sweep generator for initiating said time base sweep upon receiving said first trigger signal, said sweep generator including a first time base generator producing a first ramp waveform in response to said first trigger signal, a delayed trigger generator providing a second trigger signal in response to a given voltage level of said first ramp waveform, and a time base generator driven by said delayed trigger generator, said second time base generator providing a ramp waveform for establishing said time base sweep, and wherein said means for delaying the generation of said horizontal deflection signal includes a step wave generator operating to produce a step wave output at times corresponding to selected first trigger signals, and means for adding said step wave output to said first ramp waveform in order to alter the time of occurrence of said second trigger signal only during such operation of said step wave generator.

9. The oscillographic instrument according to claim 3 wherein an electrical value is also added to a second deflection signal in said oscillographic instrument causing substantially simultaneous displacement of said second display by means of both the vertical and horizontal deflection means in both vertical and horizontal directions, and means for varying the magnitude of said electrical values for adjusting the said displacement.

10. An oscillographic instrument providing a first display of a recurrent electrical input signal, said instrument comprising vertical deflection means generating a vertical deflection signal in accordance with the ampiltude of said input signal for determining the amplitude of such first display, horizontal deflection means generating a horizontal deflection signal for providing a time base sweep, means for periodically adding an electrical value to at least one such deflection signal in said oscillographic instrument causing displacement in the deflection of said deflection means to provide a second adjustment display, means for periodically delaying the generation of said horizontal deflection signal so that said second display depicts a portion of said input signal representative of said input signal at a time entirely subsequent to the portion of said signal depicted by said first display according to the amount of delay provided by said last mentioned means, in order to provide comparison of time separated portions of said input signal, wherein the length of said horizontal deflection signal is commensurate with the length of each of said portions, and means for selectively adjusting the amount of delay of said means for delaying the generation of said horizontal deflection signal in order to vary the time separation between said displays.

References Cited

UNITED STATES PATENTS

| | | | |
|---|---|---|---|
| 2,293,135 | 8/1942 | Hallmark | 324—121 |
| 2,539,971 | 1/1951 | Potjer | 324—121 |
| 2,548,276 | 4/1951 | Weisbecker | 324—121 |
| 2,563,395 | 8/1951 | Carpentier | 324—121 |
| 2,936,418 | 5/1960 | Young | 324—121 |
| 3,277,372 | 10/1966 | Hegeman | 324—121 |

FOREIGN PATENTS

| | | |
|---|---|---|
| 813,967 | 5/1959 | Great Britain. |

RUDOLPH V. ROLINEC, Primary Examiner

E. F. KARLSEN, Assistant Examiner

U.S. Cl. X.R.

324—77, 88

PO-1050
(5/69)

UNITED STATES PATENT OFFICE
CERTIFICATE OF CORRECTION

Patent No. 3,457,505 Dated July 22, 1969

Inventor(s) PHILIP S. CROSBY

It is certified that error appears in the above-identified patent and that said Letters Patent are hereby corrected as shown below:

Column 7, line 38, before "time" insert -- second--

Column 8, line 18, change "adjustment" to -- adjacent --

SIGNED AND
SEALED

OCT 21 1969

(SEAL)
Attest:

Edward M. Fletcher, Jr.
Attesting Officer

WILLIAM E. SCHUYLER, JR.
Commissioner of Patents